United States Patent
Mullan et al.

(10) Patent No.: US 7,539,869 B1
(45) Date of Patent: May 26, 2009

(54) SYSTEM AND METHODS FOR USING A SIGNATURE PROTOCOL BY A NONSIGNING CLIENT

(75) Inventors: Sean J. Mullan, Somerville, MA (US); Raghavan N. Srinivas, Chelmsford, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 770 days.

(21) Appl. No.: 10/664,613

(22) Filed: Sep. 17, 2003

(51) Int. Cl.
*H04L 9/00* (2006.01)
*H04L 9/32* (2006.01)
*G06F 7/04* (2006.01)

(52) U.S. Cl. .............. 713/176; 713/168; 713/169; 713/170; 713/171; 713/172; 726/14; 726/27; 726/28; 726/29; 726/30; 380/285

(58) Field of Classification Search .............. 713/176
See application file for complete search history.

(56) References Cited

U.S. PATENT DOCUMENTS

2001/0051996 A1* 12/2001 Cooper et al. .............. 709/217
2002/0040431 A1* 4/2002 Kato et al. ................. 713/168
2003/0093678 A1* 5/2003 Bowe et al. ................ 713/180

* cited by examiner

*Primary Examiner*—Longbit Chai
(74) *Attorney, Agent, or Firm*—Brooks Kushman, P.C.

(57) ABSTRACT

In a networked computer environment, a client is unencumbered from signature generating components, yet conversant to transmit signature-based documents in a signature-based metalanguage such as XML. The nonsigning client/user invokes a signature from a signature server to send a payload of data in a signed message format to a recipient also conversant in the metalanguage, according to the metalanguage format. The nonsigning client receives a signature block including a signature value from the server. The client identifies a payload for transmission according to the metalanguage. Employing the metalanguage interpreter in client, the client stores the payload data in the signature block without disrupting the signature and the data it covers in the signature block. The nonsigning client the sends the resulting signature message including the payload data and the signature value, in the metalanguage format, to the recipient destination conversant in the metalanguage. Accordingly, the nonsigning client employs signature-based messages without the encumbrance of cryptographic components.

28 Claims, 6 Drawing Sheets

SYSTEM AND METHODS FOR USING A SIGNATURE PROTOCOL BY A NONSIGNING CLIENT

BACKGROUND OF THE INVENTION

Modern computer based information processing systems transmit and process data according to a variety of protocols, languages, and formats. As different languages employ different constructs and representation properties, application developers typically select a language for a particular task in order to exploit the capabilities of the particular language in a manner well suited to the task at hand. Further, the languages each impose particular processing constraints, typically in the form of an executable object or component, which executes or performs on a particular computer to receive and process data in the protocol, language, or format in which the component is conversant.

Accordingly, when a computer receives a message in a particular protocol, language, or format, it typically requires a component conversant in that protocol, language, or format in order to process and respond to the message. Therefore, it is beneficial for an individual computer system, or node, to have the capability to execute many components for the protocols, languages, and formats for which it may receive data. However, each component entails certain overhead encumbrances in the way of memory, disk storage, and processing demands. Accordingly, it is typically infeasible, undesirable, or expensive to equip a node to handle most all different protocols, languages, and formats.

Further, many conventional applications employ subcomponents in the form of plug-ins, libraries, directories, and other forms. These additional components are typically user selectable depending on the needs of the context in which the user invokes the application. For example, a typical conventional word processing program uses a common installation screen sequence. Part of the screen sequence includes options such as dictionaries for spelling check functions and foreign language support. Affirmative acknowledgement causes the installation to install additional components to support spelling and foreign languages. However, electing not to install such additional components, nonetheless, allows the application to process documents accordingly. The omitted components only affect operation if an attempt is made to invoke them.

Therefore, efficient node deployment suggests configuring nodes with the capability to handle expected protocols, languages, and formats which the node expects to encounter. For example, it is inefficient to install a spreadsheet application, or a second word processing application, on a PC for which the user will not be likely to use. Conversely, it is inefficient to omit an application, such as a slide viewer, which the user then needs to find and install in response to an email attachment. In particular, certain specialized and/or mobile computerized equipment imposes greater restrictions on available resources. Equipment such as laptop computers, Personal Digital Assistants (PDAs), and wireless phones need to streamline demand on available processing resources. In such an environment, tradeoffs of performance and flexibility typically dictate an optimal component set for configuration of such devices. Such an optimal component or protocol processing set may not be robust enough to handle all message types.

SUMMARY

Conventional network computer systems encounter a variety of configuration and optimization constraints and tradeoffs. In a conventional node of a particular network system, the conventional node configuration expects to handle particular communications or transmissions according to an expected set of protocols, language, and formats. Accordingly, a deploying user typically configures such a conventional node with resources sufficient to handle some or most expected protocols, languages, and/or formats. However, efficiency suggests that it may not be feasible to enable conventional components to handle all types of processing. Tradeoffs between robustness, performance, and cost result in an attempt at an optimal set of conventional components for a particular context in which the node expects to process. Such optimization is more imperative in specialized, limited resource contexts such as conventional PDAs, laptops, and cellphones, where resources for handling throughput may be even more limited. For example, components to support authorization and encryption in such nodes tend to consume substantial computational and storage resources. Accordingly, capability to support encryption via digital signatures may not be feasible to be programmed into certain devices.

Typical conventional approaches have a user configure a node, such a client computing device (client) by installing particular conventional components for processing a particular type of data (throughput). Each conventional component corresponds to executable objects and/or data for processing throughput according to a particular protocol, language, or data and/or message format. Certain processing approaches subdivide the components into a set of subcomponents, which are user selectable depending on expected processing. However, the conventional configuration limits the capabilities of the computer or user device to the installed components.

For example, one of many languages, protocols, and formats which a user computing device may employ is the Extensible Markup Language (XML). Since XML is widely deployed and typically operates in conjunction with HTML (Hypertext Markup Language) for Internet usage and data exchange, many applications are conversant in XML, and/or other scripting languages, and can interoperate with other applications via XML. However, while the popularity of XML is due to the substantial ease with which a developer may implement XML applications, conventional XML processing requires substantial computing overhead.

Further, in addition to the resource limitations of the smaller devices described above, there is an associated overhead cost for managing a PKI for every client that wants to use XML Digital Signatures. Therefore, even for a client which may be powerful enough to support XML signatures, the overall cost of managing the PKI and security administration for the client raises a consideration, regardless of the processing power or constraints of the client.

In a conventional XML configured environment, therefore, a user may consider certain properties of XML unnecessary. Accordingly, such a user need not configure components corresponding to such properties on their computing device. One such property, or component, of XML are XML signatures, or the "XML-Signature Syntax and Processing" recommendation promulgated by the World Wide Web Consortium (W3C), also endorsed as the Internet Engineering Task Force (IETF) RFC 3275. While adding substantial security functionality to conventional XML based documents, the signature capability imposes substantial processing and resource burdens on the client node for generating the signatures. Such conventional signatures employ computationally intensive algorithms to generate the signature, and conventional systems require a Key Management System (KMS) that provides an access path to a Certificate Authority (CA) and/or other integration with a conventional public key infrastructure (PKI) to manipulate and identify the public and private keys which XML manipulates for signed transactions. Accordingly, a conventional user node conversant in XML signatures must include additional XML signature components to support such conventional XML signature capability.

For example, say a particular client is on a business trip and is using a PDA computer to communicate with their home office from an airport. The PDA has the XML component installed, however, as a memory saving measure, does not have the subcomponent for supporting XML signatures. The user attempts to access the accounting system at the office, and logs in accordingly. As the accounting system also employs XML, the user successfully navigates using XML-based transmissions. Now suppose that a customer has called the user and issued a change to a recent order. The user attempts to remotely change the particular customer's balance to correspond to the change order. However, the accounting system is set up to employ secure signature-based transmissions when updating or writing monetary balances. Therefore, the remote user is unable to generate a signed XML transaction for changing the customer's balance.

It would be beneficial, therefore, to employ a system and method for enabling a client node which does not have signature capability (i.e. XML signatures) to nonetheless send and receive signed XML transmissions (messages, or documents) to enable interoperability with applications that expect and/or recognize signed XML messages. In a metalanguage such as XML, the transmissions (messages) include a sequence of nested fields. As indicated above, the signature is a field which "signs" one or more other fields through the generation of a mathematical value which relates the data to the signature through a cryptographic value, or key, as is known to those of skill in the art. The signature field in an XML message is optional, and is included with XML messages according to the XML signatures protocol identified above.

A user without the XML signature capability configured maintains the ability to read, interpret, and generate XML messages without signatures. Additional XML signature components would enable the signing capability provided by XML signatures. Accordingly, in the example above, the remote user PDA is operable to receive and transmit XML messages via the PDA (nonsigning user), but is inoperable to itself create or process the signature portion of an XML message.

In the case where a signed XML message is called for, a separate server configured to compute XML signatures generates an XML signature message (i.e. an XML message including the XML signature field). The server, in response to the nonsigning client, sends the XML signature message to the non-signing client. The nonsigning client is operable to access the other XML fields without manipulating the XML signature. Such signature use by nonsigning clients relieves the nonsigning clients of the need to configure XML components for signing yet allows the ability to process, receive, and transmit signed XML signature documents (messages).

By way of further example, in a public key system supported by a public key infrastructure (PKI), complex interrelations can arise between parties employing keys for security and encryption. A public key system employs a public portion and a private portion key pair for each party to a transaction. The pair of keys are different but mathematically related by factors of large prime numbers. Substantial computational resources are employed to generate the key pair. A user, or party to a cryptographic transaction, always retains their private portion of the key pair. The public portion is usually published via a public repository such as an LDAP (Lightweight Directory Assisted Protocol) directory. Typically, each party may be authenticated by a third party certificate authority (CA), trusted by one party and validating that party to the other party. Further, a party may employ chaining of certificates to link trusted relationships between multiple CAs, effectively compounding the user of the keys. Also, keys may be used for both encryption and authentication, or both, and are operable on portions, such as a hash, or on an entire message. Key management and cryptographic techniques are applicable and may be computed according to a variety of protocols known to those of skill in the art. Therefore, key usage rapidly increases the computational complexity, and hence the resources consumed, for a particular transaction.

Further to the example above, the nonsigning user/client at the airport, in accordance with a particular configuration of the invention described herein, requests a signature block from a server. The signature block is an XML message block populated with a signature generated at the server. Alternatively, the user/client requests only the signature, and stores the signature in the appropriate field in an XML message which the user generates on their PDA (recall the user is XML enabled/conversant, merely not configured to perform cryptographic operations such as XML signature generation, but otherwise able to process XML). In either case, the user device now stores a signed XML message block (signature block) operable to be read and interpreted as a signed XML message by an XML interpreter at a destination of the message, in this case the home office accounting system.

Because of the structure of XML, the signature block includes both signed and unsigned fields. The signed, or covered, fields are the fields to which the signature applies and from which the server generates the signature. The unsigned fields remain independent from the signature generation. Therefore, these unsigned fields may be written by the user's PDA without disrupting the signature. Accordingly, the user PDA stores payload data in the unsigned fields (information objects, or assertions) in the signature block for transmission to the destination accounting system. The user PDA, not equipped with signing capability, nonetheless writes a payload to a signature block which the destination accounting system will receive and interpret as a signed XML message.

The invention described herein substantially overcomes many of the shortcomings present with the aforementioned conventional signature-based communication mechanisms. In a particular configuration, the client is unencumbered from signature generating components (i.e. does not have XML signature components installed), yet is conversant in XML. In operation, the nonsigning client nonetheless receives a request to send a payload of data in a signed message format to a recipient destination in the XML metalanguage, according to the metalanguage format. Note that while the nonsigning client is not operable to generate the signature to include new data, such additional signing is not desired in this context.

The nonsigning client requests and receives a signature block including a signature value from a signature server (server). In response to a local application or query, such as the accounting application example above, the client generates and/or identifies a payload responsive to the application or query, for transmission to a recipient according to the metalanguage. Employing the metalanguage interpreter in the nonsigning client, the nonsigning client stores the payload data in the signature block without disrupting the signature and the corresponding data the signature covers (i.e. "signs") in the signature block. The nonsigning client sends the resulting signature message including the payload data and the signature value, in the metalanguage format, to the recipient destination conversant (i.e. understands how to receive and process, such as via an XML interpreter) in the metalanguage. In this manner, the nonsigning client communicates in the metalanguage using signature-based messages without the encumbrance of authentication or encryption components for signing the message.

In further detail, particular embodiments of the invention provide for transmitting data according to a signature-based protocol, by generating, at a server, a signature corresponding to a signature block including a covered data portion and an information object portion. The server is conversant in a predetermined protocol (i.e. a metalanguage such as XML, in the example above) and the signature value and signature block are conformant with the predetermined protocol, such as XML signatures. The server stores the signature value in the signature block, and transmits, according to the predetermined protocol, the signature block to a client, which is also conversant in the predetermined protocol. The client receives the signature block and stores payload data in the information object portion. Further, the client stores the payload data in a nondestructive manner which preserves the covered data portion and corresponding signature without regenerating the signature, as the client dos not have signature generating ability. Therefore, the nondestructive manner allows the successive recipient destination to receive and interpret the signature block as a signed XML message block.

The signature block further includes a signature value portion for storing authentication indicators according to the predetermined protocol. Such authentication indicators include the signature value and/or other value computed via the cryptographic operation in use by the signature server. Further, the signature block includes a key information portion for storing the public key or other validation instrument operable to authenticate the signature. In general, the validation instrument corresponds to an inverse operation of the operation for generating of the signature, such as, for example in a public key system, the validation instrument is a public key part corresponding to a private key part. In such an exemplary public key configuration, the validation instrument is a public key and the generation of the signature involves the private key corresponding to the public key.

In another particular configuration, the information object portion stores the payload data from the nonsigning client (i.e. in which the client is unencumbered by components for signature generation operability). The client may further generate an XML transmission block or other protocol unit according to the predetermined protocol. The transmission block from the client is therefore operable to be received as a signature authenticated transmission by a destination node according to the predetermined protocol. In this manner, the nonsigning client may transmit a signature bearing (i.e. signed) message to a recipient. Such a signed message may be significant for interoperability or other reasons, such as the example above, where the remote accounting system expected an update message to be signed.

In another arrangement, the signature corresponds to the covered data portion of the signature block, since a signature corresponds to (and is generated from) a particular item of data. The signature generation may also be preceded by computing a digest on the covered data portion. As is known to those of skill in the art, a digest is substantially indicative of the data in the covered data portion (i.e. a hash which is difficult to determine without the actual data). The digest authenticates the data by being substantially unrecreatable by different or alternate data, and therefore provides authentication assurances without encumbering the entire covered data portion to computationally intensive encryption operations. Since the digest is shorter than the data it corresponds to, encrypting (i.e. computing a signature) for the digest is more efficient than the entire data body.

The invention as disclosed above is described as implemented on a computer having a processor, memory, and interface operable for performing the steps and methods for signature use by nonsigning clients as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a nonsigning client process or processes that causes the computerized device to perform any and/or all of the method embodiments, steps and operations explained herein as embodiments of the invention to allow execution of instructions in a computer program such as a Java application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
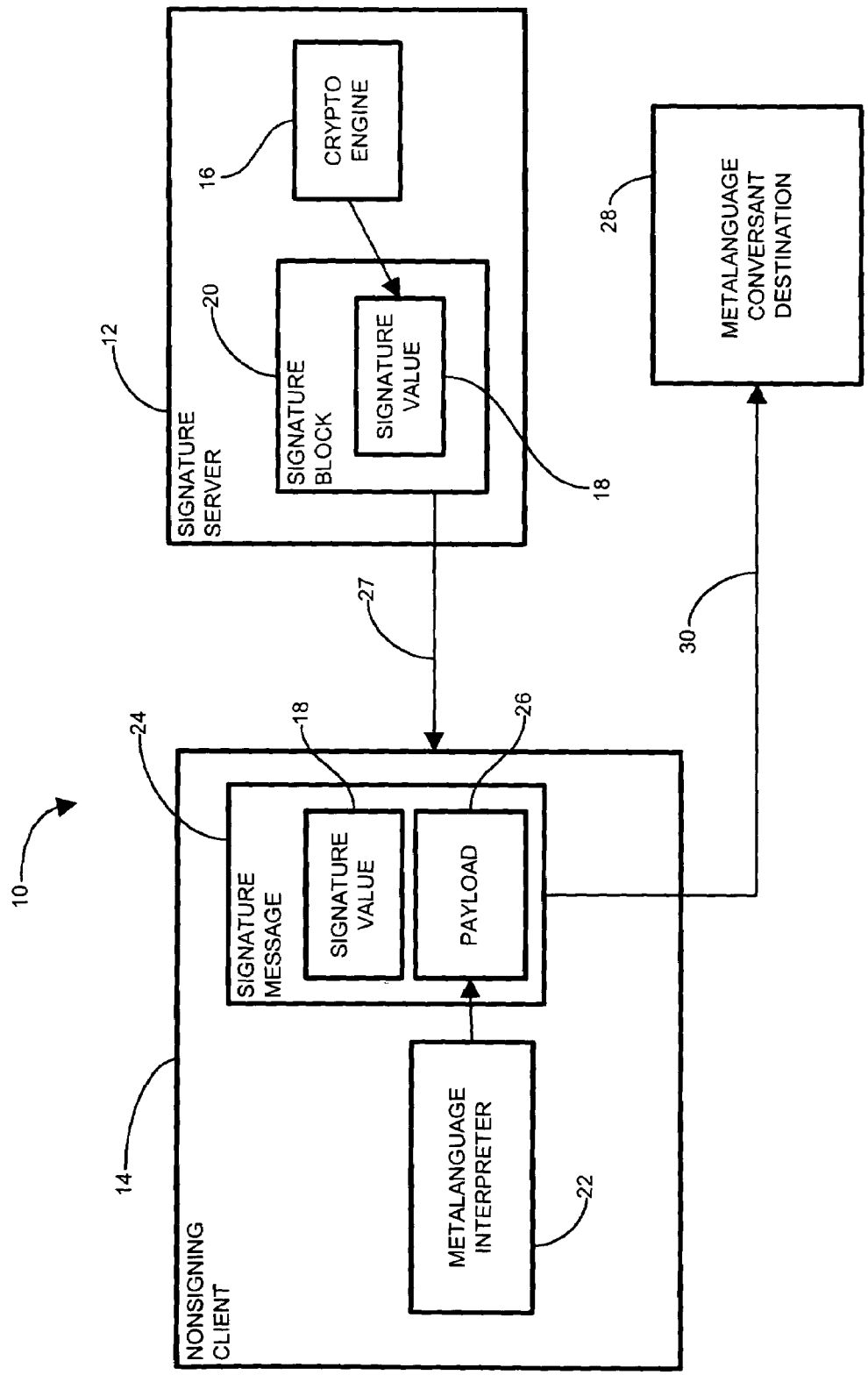
FIG. 1 is a block diagram of a computer system suitable for use with the present invention.

Embodiments of the invention significantly overcome many of the shortcomings present with the aforementioned conventional signature-based communication mechanisms. In a particular configuration, the nonsigning client is unencumbered from signature generating components (nonsigning client), and conversant in the signature-based metalanguage such as XML. The client elects to send a payload of data to a recipient destination (destination) also conversant in the metalanguage, according to the metalanguage format. The nonsigning client receives a signature block including a signature value from a server, and therefore stores a signed XML message although without the processing capability (components) for authenticating or regenerating the signature. The nonsigning client then generates and/or identifies a payload for transmission according to the metalanguage format.

The nonsigning client (user) without the XML signature capability configured, therefore, nonetheless maintains the ability to read, interpret, and generate XML messages without signatures. Additional XML signature components would enable the signing capability provided by XML signatures, however would impose additional overhead associated with a PKI. Accordingly, in the example above, the remote user PDA is operable to receive and transmit XML messages via the PDA (nonsigning user), but is inoperable to itself create or process the signature portion of an XML message.

XML, therefore, provides extensions for XML signatures. The nonsigning client, while conversant in XML in that it can receive, process, and transmit messages according to the XML metalanguage, does not have the ability to generate signatures according to the XML signatures extensions to XML. In the case where a signed XML message is called for, a separate server configured to compute XML signatures generates an XML signature message (i.e. an XML message including the XML signature field). The server, in response to the nonsigning client, sends the XML signature message to the non-singing client. The nonsigning client accesses the other XML fields, such as by storing payload data, without manipulating the XML signature. Such signature use by nonsigning clients relieves the nonsigning clients of the need to configure XML components for signing yet allows the ability to process, receive, and transmit signed XML signature messages (documents).

Invoking the metalanguage interpreter in the nonsigning client, the nonsigning client stores the payload data in the signature block without disrupting the signature, and the data the signature covers, in the signature block. The nonsigning client sends the resulting signature message including the payload data and the signature value, in the metalanguage format, to the recipient conversant in the metalanguage. In this manner, the nonsigning client communicates in the metalanguage using signature-based messages without the encumbrance of an authentication or encryption component for signing the message.

In a particular configuration, such signature usage by a nonsigning client, i.e. a client without the capability to generate keying material and compute signatures, is beneficial when compatibility with a particular metalanguage is needed to enable processing of a transmission or object corresponding to the particular metalanguage. For example, as indicated above, XML compliance is desirable because of widespread deployment and usage of XML.

The use of an XML signature-based document, or other XML processing object, may be desirable by a client node without XML signatures installed (i.e. a nonsigning client not having components for supporting XML signatures). Such usage is beneficial when XML conformance is desired for a particular processing object or for generating an XML signed processing object by a user without signing capability. Alternatively, such communications involving signature usage by a nonsigning client may occur according to other platforms, such as alternative languages or metalanguages, protocols, and formats.

FIG. 1 is a block diagram of a computer system 10 suitable for use with the present invention. Referring now to FIG. 1, the system 10 includes a signature server 12 (server) and a nonsigning client 14 (client). The signature server 12 includes a cryptographic engine 16 operable to compute a signature value 18 and write the signature value 18 into a signature block 20. The nonsigning client includes a metalanguage interpreter 22 operable on a signature message 24, including the signature value 18 and a payload 26. A metalanguage conversant recipient, such as the XML conversant destination 28 (destination), is operable to receive the signature message 24.

The signature server 12 connects to the nonsigning client 14 via any suitable local or wide area network mechanism interface, as shown by arrow 27. Efficiency suggests a more local configuration, lest the transmission overhead exceed the savings of relieving the client 14 of the signature generation overhead. The nonsigning client 14 connects to at least one recipient, such as the XML conversant destination 28, as shown by arrow 30, which may also be any suitable network connection including an Internet connection, described further below.

In operation, the nonsigning client 14 transmits a request to the signature server 12 indicating a need for a signature block 20. The signature block 20 is an object, such as a data structure or document, conformant with the metalanguage and operable to receive both the signature 18 from the signature server 12 and the payload 26 from the nonsigning client 14. Using the metalanguage interpreter 22, the nonsigning client 14 receives the signature block 20. In a particular configuration, the metalanguage interpreter 22 is operable to send and receive according to a predetermined protocol, language, or format such as the XML metalanguage.

Figure 2:
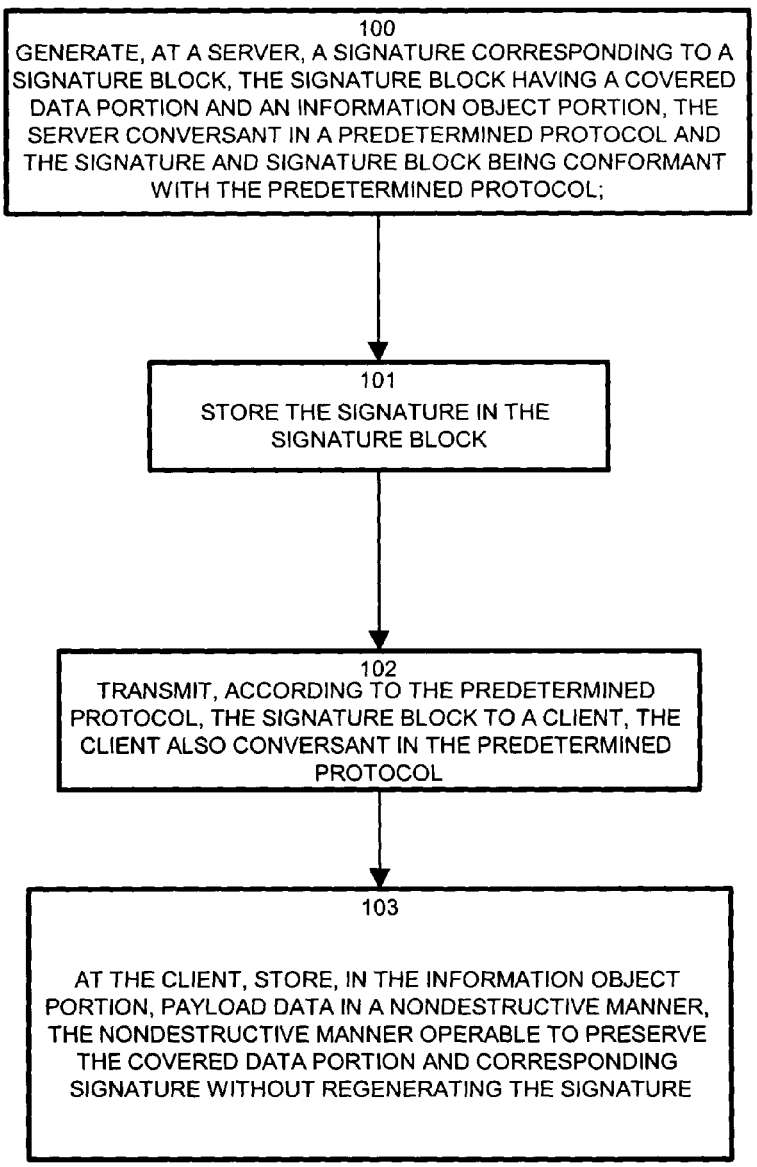
FIG. 2 is a flowchart for employing signature-based messages by a nonsigning entity.

FIG. 2 is a flowchart for employing signature-based messages by the nonsigning client 14. Referring to FIGS. 1 and 2, at step 100, the signature server 12 generates a signature value 18 corresponding to a signature block 20. As indicated above, the signature block 20 has a covered data portion for storing the data upon which the signature was generated, and an information object portion for storing payload data from the client 14. The server 12 is conversant in a predetermined protocol, such as XML, and the signature value 18 and signature block 20 are conformant with the predetermined protocol so that the subsequent destination 28 of the signature block 20 receives and interprets an XML based message.

At step 101, the server 12 stores the signature in the signature block 20 for transmission to the nonsigning client 14. Transmission is by any suitable mechanism 27, including Internet, wireless, LAN, or a combination of these.

At step 103, the server 12 transmits the signature block 20 to the client 14 according to the predetermined protocol (i.e. XML). As the client 14 is also conversant in the predetermined protocol, the client 14 receives the XML signature block 20 and stores the payload data 26 in the information object portion, described further below. The client stores the payload data in a nondestructive manner, which preserves the covered data portion and corresponding signature value 18 without regenerating the signature. Therefore, the information object portion is a part of the signature message 24 independent of the signature value 18 and which stores payload 26 without destroying the signature value 18.

Such generation of a signature message 24 by the nonsigning client 14 is beneficial when the client 14 does not want to or is unable to maintain key generation capability, along with associated processing demands and key management overhead, but which nonetheless needs to be conversant in a signature-based protocol or language such as XML signatures. Such an approach is particularly beneficial when the payload data 26 which the client 14 transmits is already covered by other secure means. Since the client 14 does not generate the signature value 18 over the signed data 32 in such a signature message, the payload data 26 written by the client 14 is not covered by the signature 18. The signature value 18 covers the signed data portion 32, and so while the signature message 24 satisfies signature requirements for items such as interoperability and security protocol conformance, the client 24 does not require the ability to cover (i.e. generate signatures corresponding to) payload data 26 with the signature value 18.

Figure 3:
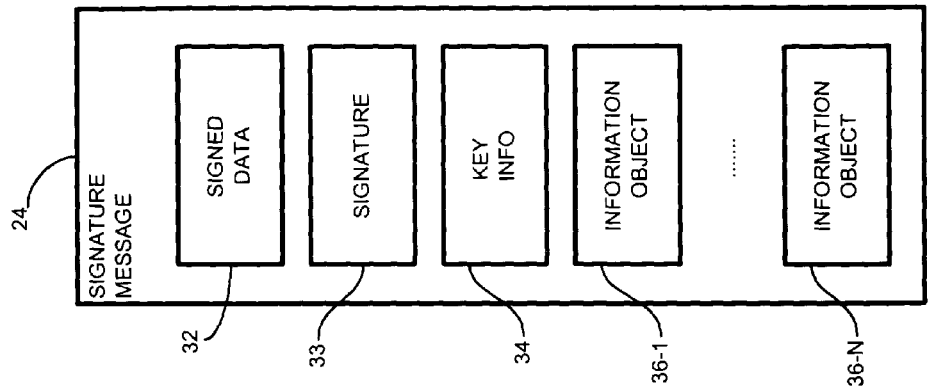
FIG. 3 shows a signature message employed by a nonsigning client.

FIG. 3 shows a signature block employed by a nonsigning client 14. As shown in FIG. 3, the signature message 24 includes a signed information portion 32, a signature value portion 33 storing signature value 18 covering the signed info portion 32, a key info portion 34, for storing key information such as the public key corresponding to the private key used to generate the signature value 18, and at least one information object portion 36-1-36-N, or assertion, collectively establishing the payload 26.

Referring to FIGS. 1 and 3, the signature block 20 refers to a syntactical data unit according to the metalanguage, and the signature message 24 refers to the syntactical data unit including a signature 18 and a payload 26. Both the signature block 20 and the signature message 24 are structures conformant to the metalanguage employed between the signature server 12 and the nonsigning client 14. In the particular arrangement shown, the metalanguage is XML, and the signature block 20 and signature message 24 are XML objects according to XML syntax rules, or a syntactical data unit. Therefore, the signature message 24 includes the signature 18 on behalf of the nonsigning client 14 in conjunction with the payload portion 26.

In operation, the signature server 12 generates the signature block 20 according to the metalanguage, typically a nested structure having fields according to the syntax rules (not specifically shown). The signature server 12, at a minimum, generates the signature value 18 (since the client 14 is unable to do so) and stores the signature value 18 in the signature block 20. The server 12 generates the signature value 18, in a typical configuration, according to the data in the signed info portion 32, and typically employs a digest or hash operation such as SHA or MD5 as is known in the art. Other fields and values may be employed for generating the signature value. The generated signature block 24 is adapted to further incorporate or store key info 34 and one or more information objects 36-N. The nonsigning client 14 subsequently stores assertions, or payload data, in the information objects 36-n as the payload 26. The signature message 24 therefore includes the payload 26 in conjunction with a signature value 18 in compliance with the metalanguage, such as a document having an XML signature, operable for further transmission and/or processing according to the rules and properties associated with XML signature documents.

The key info portion 34, in a particular configuration, stores the public key corresponding to the private key used to generate the signature value 18 for authenticating and/or decrypting the signed info 32, in a so-called self-authenticating message. Alternatively, an entire public key certificate may occupy the key info portion 34. Since public keys are not kept secret and are widely disseminated via repositories such as LDAP directories, inclusion in a self-authenticating message does not compromise message integrity.

Figure 4:
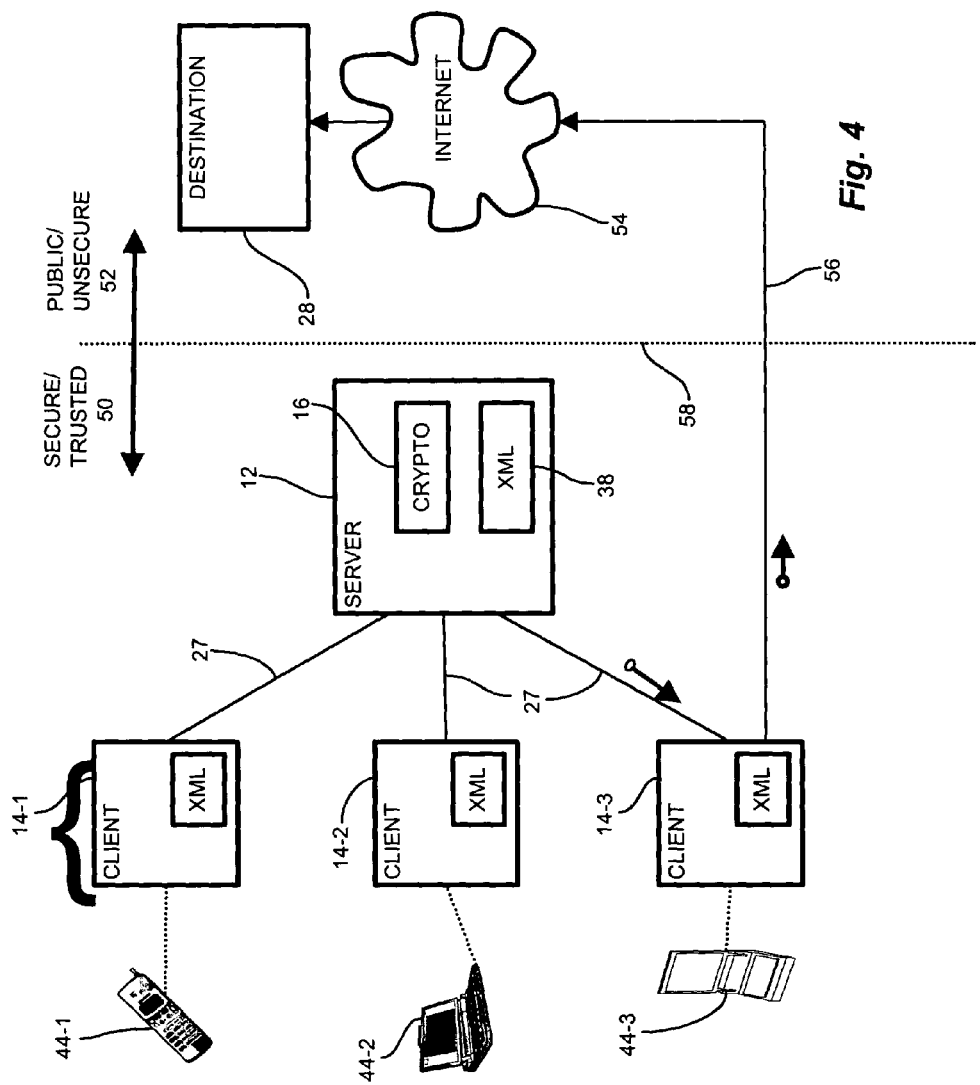
FIG. 4 is a block diagram of multiple nonsigning clients employing the present invention to transmit via a public access network.
Figure 5:
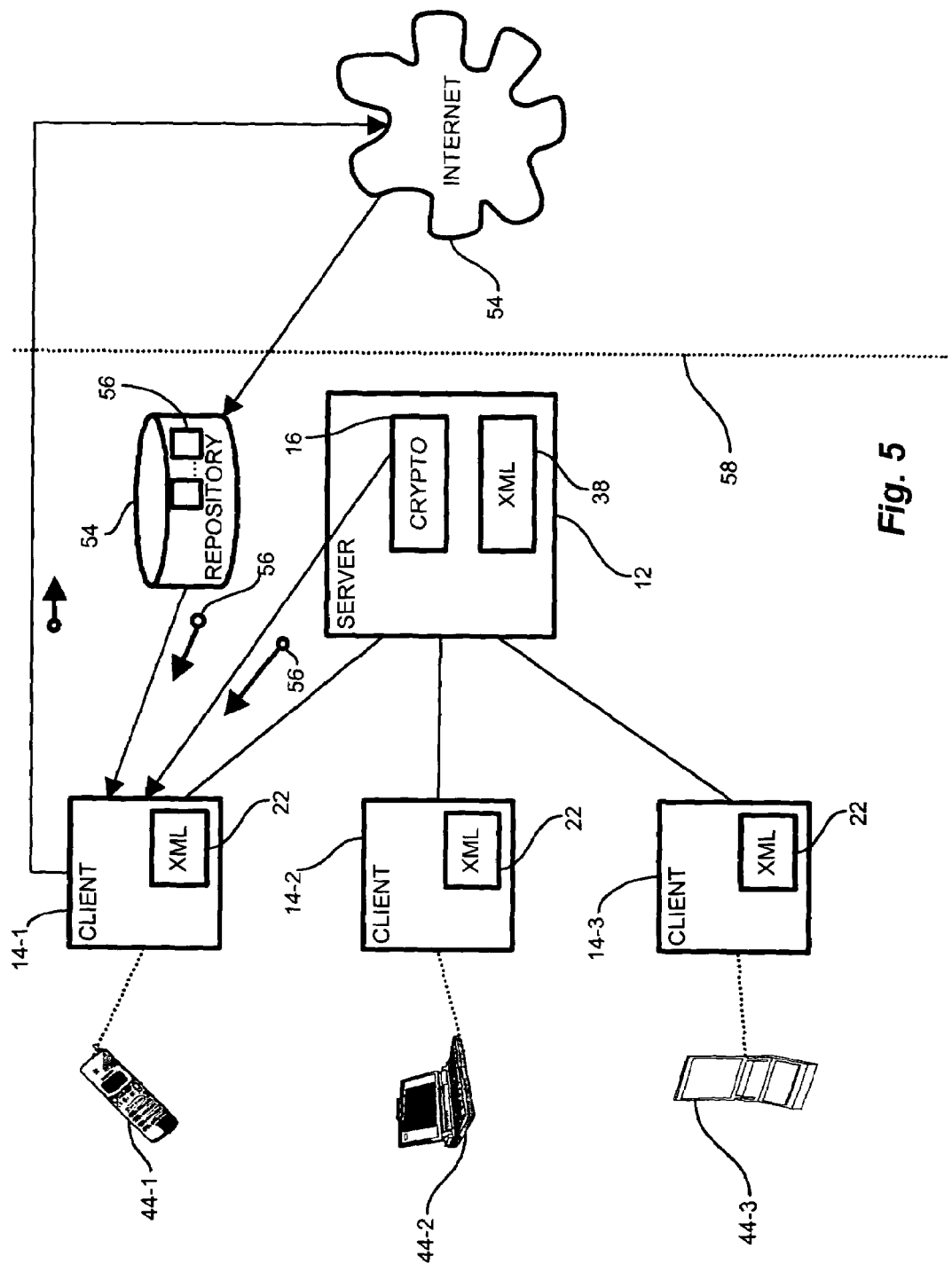
FIG. 5 is a diagram showing a nonsigning client accessing a repository of pregenerated signatures.

FIG. 4 is a block diagram of multiple nonsigning clients employing the present invention to transmit the signature message 24 via a public access network. Referring to FIG. 5, the network 10 further includes a plurality of nonsigning clients 14-1-14-3 and user devices 44-1-44-3 (i.e. customer premises equipment CPE) including a wireless phone 44-1, laptop 44-2, and PDA 44-3. The system 10 also includes an XML interpreter 38 at the signature server 12, in addition to the crypto engine 16. Additionally, the metalanguage interpreter 22 at each of the clients 14-N is an XML interpreter 40. A secure/trusted side 50 of the network 10 includes the signature server 12 and the nonsigning client 14, shown separate from the public/unsecure side 52 including the Internet 54 by dotted line 56.

Each of the clients 14-1-14-3 (14-N generally) corresponds to one of the user devices 14-N, in which the user device 44-1-44-3 (44-P generally) employs the client 14-N in the form of a component, such as a software process, firmware entity, EPROM, or other executable entity for purposes of performing the methods disclosed herein. Each of the clients 14-n has an XML interpreter 40, or processor, for receiving the signature block 20 and transmitting the signature message 24, in an XML compliant manner to an XML conversant destination 28 via the outgoing line 30.

In operation, the server 12 builds the signature block 20 and sends it to the client 14-3 via the trusted interface (lines) 27 on the secure side 50. The client 14-3 employs the XML interpreter 40 to access and store payload data 26 in the information object 36-M portions of the signature block 20 to build the signature message 24. As the client 14-3 has the XML interpreter 40, it may access and update/add information object 36-n portions to correspond to the payload 26 data (assertions) to add.

In the particular embodiment shown, the payload 26 is not covered or included in the signature 18 computation at the signature server 12. However, the transmission of the signature block remains secure via the trusted interface connection 27 between the server 12 and the client 14, being on the secure side 50 of the network. The secure side may be demarcated, as shown by dotted line 58, by any suitable means, such as firewalls, VPNs (virtual private networks), and SSL (Secure Socket Layer), by way of example only.

The nonsigning client transmits the signature message 24 including the payload 26 and signature value 18 to the destination 28, via the Internet. Since the payload 26 is independent of the signature value 18, the payload 20 may already be protected by further encryption and/or security measures. Therefore, this configuration is particularly useful by clients 14-N employing XML signatures for interoperability reasons or in instances where it is desirable to use the extensible features of XML signatures (i.e. the information object payload 36-n) to carry additional information, such as credentials, assertions, or other key information.

FIG. 5 is a diagram showing a nonsigning client accessing a repository of pregenerated signatures. Referring to FIG. 5, in this configuration, the network 10 further includes a repository 54 accessible to the clients (nonsigning users) 14-N for storing the pregenerated signatures 56. The repository 54 is in communication with and accessible by the client 14-N for transmitting the pregenerated signatures 56. Further, the cryptographic engine 16 at the server 12 may also generate the pregenerated signatures and transmit them to the client 14-N.

In operation, the client 14-N receives the pregenerated signatures 56 from either the repository 54 or the server 12. Such pregenerated signatures are not specific to a particular payload 26 at the nonsigning client 14, however, the client employs such signatures to generate an XML signature compliant signature message 24 from the pregenerated signature 56, which it stores as the signature value 18, and the accompanying payload 26 portion which collectively aggregate to form signature message 24, which may also include the signed data portion 32 and the key info portion 34.

Figure 6:
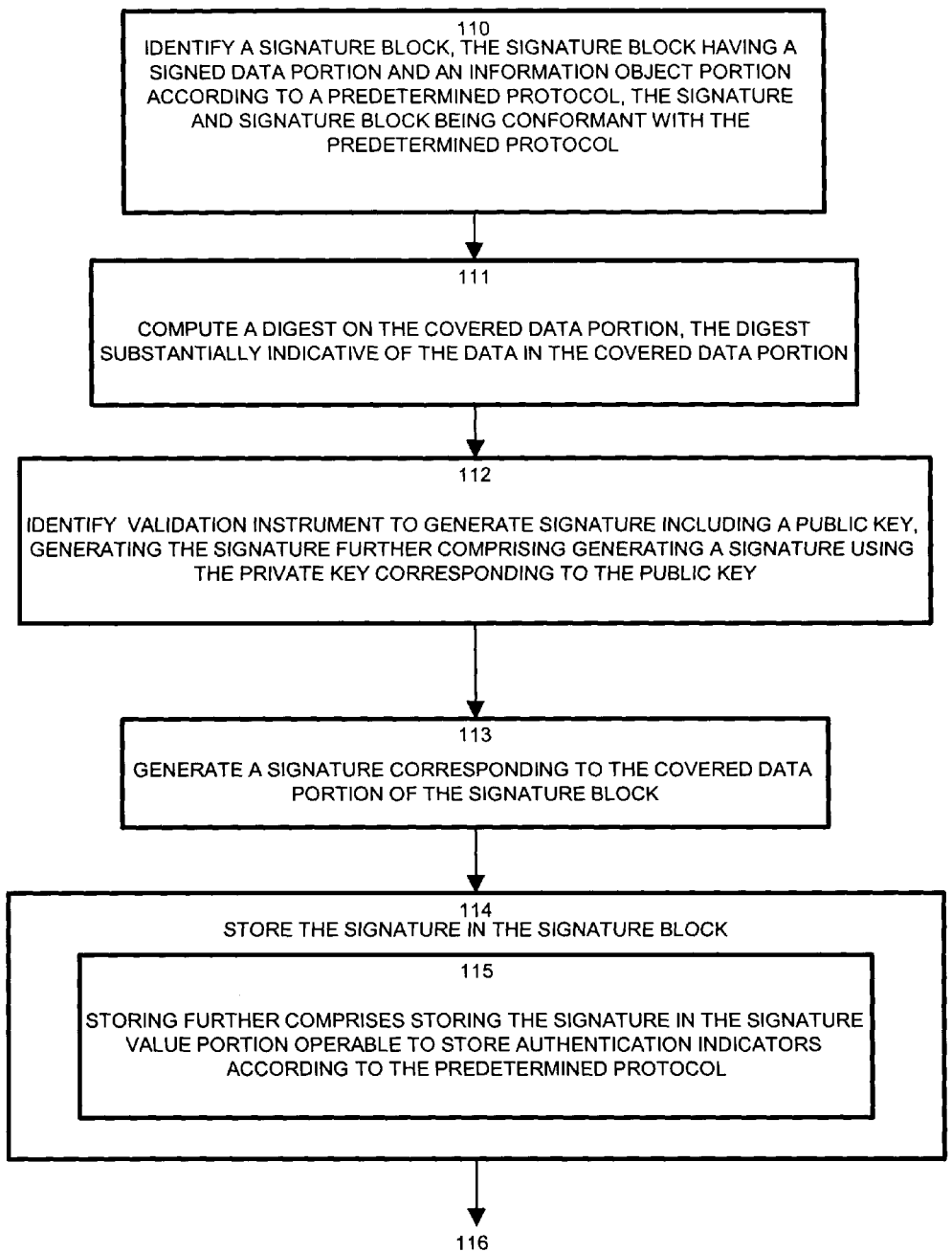
FIGS. 6 and 7 show a flowchart for signature use by a nonsigning client in further detail.
Figure 7:
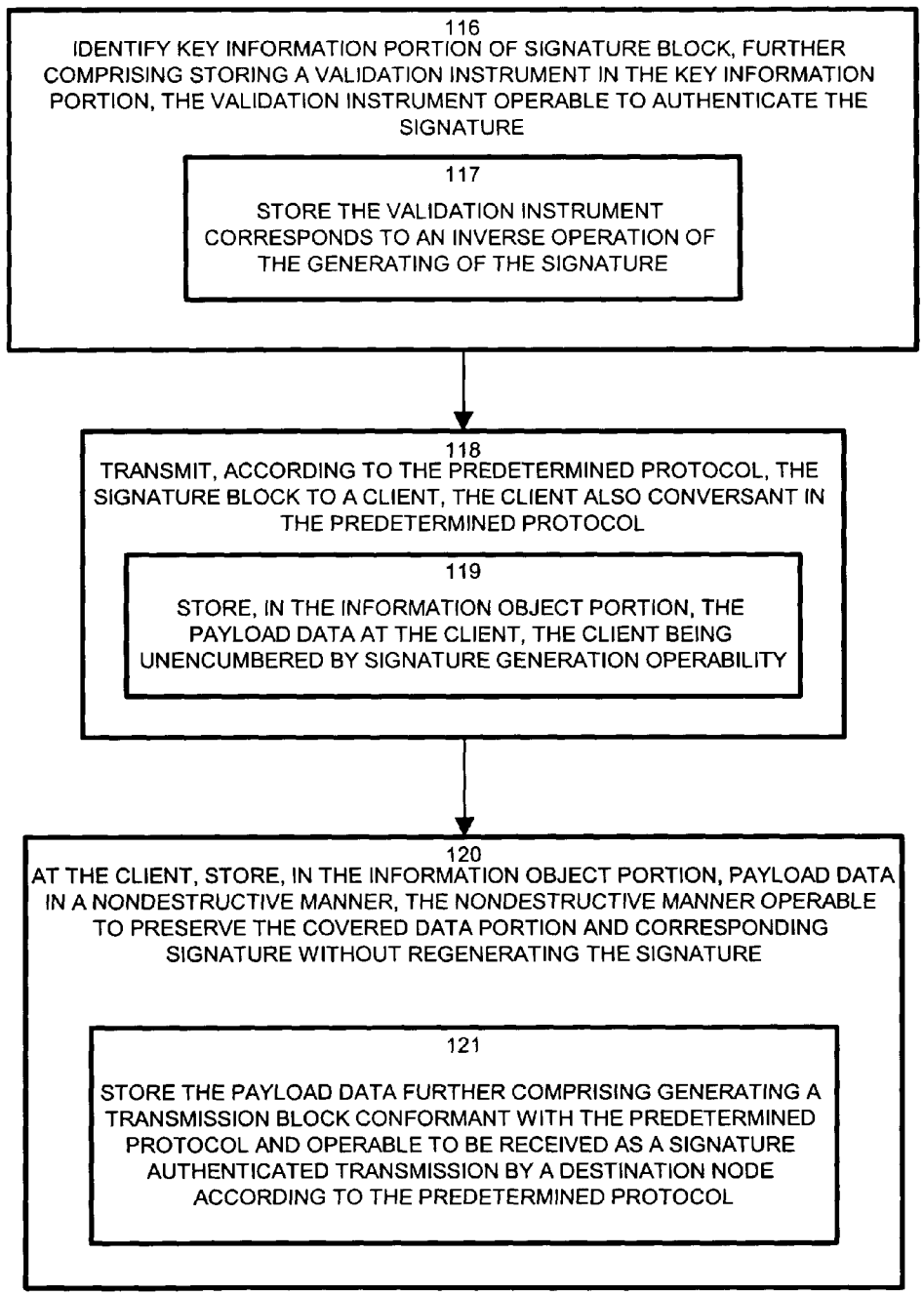

FIGS. 6 and 7 show a flowchart for signature use by a nonsigning client in further detail. Referring to FIGS. 3, 6 and 7, at step 110, the server identifies a signature value portion 33 stored in a signature block 20. The signature block 20 also has a signed (covered) data portion 32 and an information object portion 36-n. The server 12 is conversant in the predetermined protocol and the signature value 18 and signature block 20 are conformant with the predetermined protocol. The predetermined protocol may, in a particular configuration, be a metalanguage such as XML, in which the signature value 18 corresponds to XML signatures. The metalanguage is understood by the client 14 and the server 12 such that the client 14 may access the signature value portion 33 in the signature block 20 sent by the server 12.

At step 111, the server 12 computes a digest on the signed data portion 32. The digest operates as a type of fingerprint, which is substantially indicative of the data in the signed data portion 32. Such a digest, for example Secure Hash Algorithm (SHA), Message Digest 4 (MD4) and MD5, is a mathematical computation highly indicative of the data body from which it derives. The digest is based on the notion that it is highly unlikely to recreate an equivalent digest without the same source data body, and, since the digest is substantially shorter than the data body to which it corresponds, the server conserves computing resources by computing the signature 18 on the digest rather than the entire data body.

At step 112, the server 12 selects a validation instrument to employ in computing the signature 18. In a particular public key configuration, such a validation instrument is a public key pair including both a public key half and a private key half (not specifically shown), as is known to those of skill in the art, and generating the signature portion 33 further comprises generating a signature value 18 using the private key corresponding to the public key. Alternatively, particular configurations specify a validation indicator in the key info portion to provide a lookup or other mapping information to enable retrieval of the validation instrument, such as via an LDAP lookup.

At step 113, the server generates the signature 18 corresponding to the signed (covered) data portion 32 of the signature block. Since the server 12 employs the cryptographic engine 16, the server 12 performs the signature computation for the signature block 20 prior to receipt by the nonsigning client 14.

At step 114, the server 12 stores the signature 18 in the signature block 20, and at step 115, storing further includes storing the signature value portion 33 operable to store authentication indicators according to the predetermined protocol (i.e. XML signatures in the example shown). By maintaining conformance with the XML metalanguage, subsequent recipients 28 conversant in XML may read and interpret the resulting signature message 24.

At step 116, the signature block 20 further includes a key information portion 34, and storing further includes storing the validation instrument (i.e. public key portion) in the key information portion 34. The validation instrument is for authenticating the signature value 18 according to public key encryption techniques, known to those of skill in the art. The public key is typically available via a Public Key Infrastructure (PKI, not specifically shown), and by storing the public key in the key info portion 34, the server 12 builds a so-called self authenticating message.

At step 117, in such a PKI based system, the public key that is stored in the key info portion 34 is a validation instrument corresponding to an inverse operation of the operation employed for generating of the signature. Therefore, the public key is operable to authenticate the signature value 18 generated using the private key of the public key pair.

At step 118, the server 12 transmits the signature block to the client 14, according to the predetermined protocol. The client 14 is also conversant in the predetermined protocol, in this example, the XML metalanguage. At step 119, the client 14 stores the payload data in the information object portion 36. The client 14, while being unencumbered by signature generation operability (i.e. does not have XML signature components installed) is nonetheless able to store the payload data in the XML compliant signature block 20 because the client 14 is XML conversant.

At step 120, the client 14 further stores the payload data in the information object portion 36 in a nondestructive manner. The nondestructive manner preserves the signed data portion and corresponding signature 18 without interfering with the relationship between the signed data portion 32 and the signature 18, and without regenerating the signature 18. Therefore, the server generated signature value 18 remains operable to authenticate the signed data 32.

At step 121, storing the payload data 26 in the information objects 36-n further includes generating the signature message 24 as a block of data operable for transmission conformant with the predetermined protocol (i.e. XML). Since the signature message 24 complies with XML and has a valid XML signature, it is operable to be received as a signature authenticated transmission by a destination node 28 according to the predetermined protocol (XML). The payload data 26 written to the signature block 20, therefore completes and effectively generates the signature message 24 according to the XML metalanguage, including a signature value 18 and signed data 32 based on XML signatures. The signature message 24, therefore, is operable to be received as an XML compliant signature message 24 by a remote destination 28 expecting a signed XML message.

In a particular arrangement, the signature value 18 corresponds to the nonsigning client 14 by association with a unique identifier of the nonsigning client, such as an ESN (electronic serial number) of a wireless device or a MAC/IP address pair of a TCP/IP client 14. Such an association identifies the client device 14-N with respect to the signature 18, such that the signing server 12 retains identification with respect to clients 12 on whose behalf the signing server 12 generates signature values 18.

Further, particular configurations of the metalanguage, such as XML signatures, allow the signature to optionally cover the information object portions 36-n in addition to the signed data 32 portions. Accordingly, signature usage is not restricted to the signed data portion 32. Alternative configurations may optionally apply signing to other portions of the signature message 24 without running afoul of XML signature standards.

In another particular arrangement, the client 14 downloads a set of predetermined signatures to select from in building the signature message 24. Such arrangement includes the signature server 12 transmitting a plurality of signatures and, optionally, the corresponding covered data portions to the nonsigning client 14. From these downloaded signatures, the client may select a particular signature according to a predetermined order or sequence expected by the remote destination. Specifically, the client selects a first signature for inclusion in a first signature message for transmission to a destination recipient, and selecting a different, second signature for a second signature message for transmission to the same destination recipient.

In this manner, the client 14 does not appear to the destination recipient 28 to be reusing or manipulating signatures based on predetermined data. Further, the client 14 may employ other signature selection logic to present a series of signature messages. Such logic involves selecting the first and second signatures based on the signature selection logic in which the signature selection logic analyzes the covered data portion and the information object portion of the signature message to select an expected signature result at the destination recipient. Such signature selection logic may be based on a variety of criteria. For example, the signature selection logic may analyze the covered data portion based on the content type, size, creation date, sparsity of the data, and other criteria, and may selectively employ cryptographic computations, such as DSA/SHA1, RSA/SHA1, and other algorithmic selections as will be apparent to those of skill in the art.

Those skilled in the art should further readily appreciate that the programs and methods for signature use by nonsigning clients as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for signature use by nonsigning clients has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for transmitting data according to a signature-based protocol comprising:

generating, at a server and in response to a request from a nonsigning client device, a signature corresponding to a signature block having a covered data portion and an information object portion, the signature computed only on data in the covered data portion such that payload data is not included in computing the signature, the server conversant in a predetermined protocol and the signature and signature block conformant with the predetermined protocol;

storing, at the server, the signature in the signature block, the signature covering the covered data portion and the information object portion remaining independent of the signature;

transmitting from the server to the nonsigning client device, the signature block, the nonsigning client device conversant in the predetermined protocol and unable to generate the signature in the signature block, the signature block further operable to store, in the information object portion, payload data in a nondestructive manner so as to preserve the covered data portion and corresponding signature generated by the server without regenerating the signature, the covered data portion remaining unwritten by the nonsigning client device; and storing, at the nonsigning client device, payload data in the information object portion, the signature block receivable by a recipient destination having capability to authenticate the signature and conversant in the predetermined protocol.

2. The method of claim 1 wherein the signature block further includes a signature value portion, the signature value portion operable to store the signature as an authentication indicator according to the predetermined protocol, wherein storing further comprise storing the signature in the signature value portion.

3. The method of claim 1 wherein the signature block further includes a key information portion, further comprising storing an authentication indicator to a validation instrument in the key information portion, the validation instrument operable to authenticate the signature value portion using the signature.

4. The method of claim 3 wherein the validation instrument corresponds to an inverse operation of the generating of the signature.

5. The method of claim 3 wherein the validation instrument is a public key and generating the signature further comprises generating a signature using the private key corresponding to the public key.

6. The method of claim 1 wherein storing the payload data further comprises generating a transmission block conformant with the predetermined protocol and operable to be received as a signature authenticated transmission by a destination node according to the predetermined protocol.

7. The method of claim 1 wherein generating the signature further comprises generating a signature corresponding to the covered data portion of the signature block.

8. The method of claim 1 further comprising computing a digest on the covered data portion, the digest indicative of the data in the covered data portion.

9. The method of claim 1 further comprising:

generating, at the server, a set of predetermined signatures operable for insertion in a message conformant to the predetermined protocol;

storing, in a signature repository at the server, a bank of signatures including the set of predetermined signatures; and transmitting, responsive to a request from the nonsigning client device, a signature from the bank of signatures for insertion in a signature block in conjunction with a payload.

10. A method for transmitting data from a nonsigning client device according to a signature-based protocol comprising:

receiving, at a nonsigning client device, a signature block and a signature corresponding to the signature block generated by a server in response to a request from the nonsigning client device, the signature block having an information object portion and a covered data portion corresponding to the signature, the signature computed only on data in the covered data portion such that payload data is not included in computing the signature, the nonsigning client device unable to compute the signature and conversant in a predetermined protocol, the signature and signature block being conformant with the predetermined protocol;

storing, at the nonsigning client device and in the information object portion of the signature block, payload data in a nondestructive manner so as to preserve the covered data portion and the corresponding signature generated by the server without regenerating the signature, the signature covering the covered data portion and the information object portion remaining independent of the signature, the covered data portion remaining unwritten by the nonsigning client device; and transmitting, from the nonsigning client device to a recipient destination conversant in the predetermined protocol, the signature block according the predetermined protocol, the information object portion included in the signature block according to the predetermined protocol, the signature block including the public key corresponding to a private key employed in generating the signature, the included public key thus providing a self-authentication message for delivery to the recipient destination.

11. The method of claim 10 wherein the signature block further includes a signature value portion, the signature value portion operable to store the signature as an authentication indicator deterministic of the signature according to the predetermined protocol.

12. The method of claim 10 wherein the signature block further includes a key information portion operable to store an authentication indicator to a validation instrument, the validation instrument operable to authenticate the signature value portion using the signature.

13. The method of claim 10 wherein receiving the signature further comprises indexing a remote signature repository, and the nonsigning client device is further operable to store the received signature in the signature block according to the predetermined protocol.

14. The method of claim 10 further comprising
receiving an authentication instrument corresponding to the signature, and
storing the received authentication instrument in the signature block with the signed information portion and the signature.

15. The method of claim 14 wherein the received authentication instrument is a public key corresponding to the private key for generating the signature, and storing further comprising forming a self-signed message by storing the public key in the key information portion.

16. The method of claim 10 further comprising:
receiving, at the nonsigning client device, a plurality of signatures and corresponding covered data portions;
selecting a first signature for inclusion in a first signature message for transmission to a destination recipient; and
selecting a second signature different than the first signature for inclusion in a second signature message for transmission to the same destination recipient.

17. The method of claim 16 wherein selecting the first and second signatures is performed based on signature selection logic, the signature selection logic for analyzing the covered data portion and the information object portion of the signature message to select an expected signature result at the destination recipient.

18. The method of claim 17 wherein the signature selection logic is operable for analyzing the covered data portion based on at least one of content type, size, creation date, and sparsity of the data.

19. A data communications device for transmitting data according to a signature-based protocol comprising:
a cryptographic engine operable to generate, by a server in response to a request from a nonsigning client device, a signature corresponding to a signature block, the signature block having a covered data portion and an information object portion, the signature computed only on data in the covered data portion such that payload data is not included in computing the signature, the server conversant in a predetermined protocol and the signature and signature block being conformant with the predetermined protocol;
a metalanguage processor conversant in the predetermined protocol and operable to store the signature in the signature block, the signature block further including a signature value portion, the metalanguage processor further operable to store, in the signature value portion, authentication indicators according to the predetermined protocol, wherein storing further comprise storing the signature in the signature value portion; and
an interface in the data communications device operable to transmit, according to the predetermined protocol, the signature block to the nonsigning client device conversant in the predetermined protocol and unencumbered by signature generation operability, the metalanguage processor being further operable to generate the signature block having the information object portion, the information object portion further operable for storing the payload data at the nonsigning client device, the signature block further operable to receive and store, in the information object portion, payload data in a nondestructive manner so as to preserve the covered data portion and corresponding signature generated by the server without regenerating the signature, the signature block being a script having fields defined by a predetermined metalanguage syntax, the metalanguage syntax defining the position of the covered data portion and corresponding signature, the signature block receivable by a recipient device conversant in the predetermined metalanguage syntax for decoding the message.

20. The data communications device of claim 19 wherein the signature block further includes a key information portion, the cryptographic engine further operable to store a validation instrument in the key information portion, the validation instrument operable to authenticate the signature.

21. The data communications device of claim 20 wherein the validation instrument corresponds to an inverse operation of the generating of the signature.

22. The data communications device of claim 19 wherein the signature block is adapted for storing the payload data by the nonsigning client device to generate a signature message transmission block of data conformant with the predetermined protocol and operable to be received as a signature authenticated transmission by a destination node according to the predetermined protocol.

23. The data communications device of claim 20 wherein the cryptographic engine is further operable to generate the signature corresponding to the covered data portion of the signature block.

24. The data communications device of claim 19 wherein the cryptographic engine is further operable to compute a digest on the covered data portion, the digest indicative of the data in the covered data portion.

25. The data communications device of claim 19 wherein the validation instrument is a public key and generating the signature further comprises generating a signature using the private key corresponding to the public key.

26. A computer program product having an encoded set of processor based instructions defined as computer program code on a computer readable storage medium operable to store computer program logic embodied in computer program code encoded thereon for transmitting data from a nonsigning client device according to a signature-based protocol comprising:

computer program code for receiving, at the nonsigning client device, a signature block and a signature corresponding to the signature block generated by a server in response to a request from the nonsigning client device, the signature block having an information object portion and a covered data portion corresponding to the signature, the signature computed only on data in the covered data portion such that payload data is not included in computing the signature, the receiving nonsigning client device conversant in a predetermined protocol and the signature and signature block being conformant with the predetermined protocol;

computer program code for storing, in the information object portion of the signature block, payload data in a nondestructive manner so as to preserve the covered data portion and the corresponding signature generated by the server without regenerating the signature, the covered data portion remaining unwritten by the nonsigning client device, wherein storing in the information object portion further comprises storing the payload data in the information object portion at the nonsigning client device, the nonsigning client device being unencumbered by signature generation operability; and computer program code for transmitting, according to the predetermined protocol, the signature block to a recipient destination conversant in the predetermined protocol, the information object portion included in the signature block according to the predetermined protocol, wherein the signature block further includes a signature value portion, the signature value portion operable to store the signature as an authentication indicator according to the predetermined protocol, wherein storing further comprises storing the signature in the signature value portion, the signature covering the covered data portion and the information object portion remaining independent of the signature, the signature block being a script having fields defined by a predetermined metalanguage syntax, the metalanguage syntax defining the position of the covered data portion and corresponding signature, the signature block receivable by a recipient device conversant in the predetermined metalanguage syntax for decoding the message.

27. A method for transmitting data in conformance with a signature-based protocol comprising:

transmitting, from a nonsigning client device to a server, a request for a signature block operable to store signature based data corresponding to a predetermined protocol;

generating, at the server, a signature block having a covered data portion corresponding to a signature and an information object portion for storing payload data independent of the signature;

computing, at the server, a signature based only on the covered data portion such that payload data is not included in computing the signature;

storing, at the server, the computed signature in the signature block;

transmitting, from the server to the nonsigning client device, the signature block, the nonsigning client device conversant in the predetermined protocol and unable to compute and authenticate the signature;

populating, at the nonsigning client device, the information object portion of the signature block with payload data without destroying and regenerating the signature, the information object portion independent of the signature generated by the server, the populating preserving the covered data portion and the corresponding computed signature according to the predetermined protocol such that the populating is not included in computing the signature, the covered data portion remaining unwritten by the nonsigning client device; and transmitting, from the nonsigning client device to a destination, the signature block, the destination operable to (i) receive and authenticate the signature and corresponding covered data portion and (ii) receive the payload data in the information object portion.

28. The method of claim 27 wherein the predetermined protocol is XML and the signatures are conformant to XML signatures, such that storing into the information object portion includes writing in to payload fields in an XML message, the signature being an XML signature and remaining unchanged with respect to the values written in the payload fields.

* * * * *